United States Patent Office 3,397,214
Patented Aug. 13, 1968

3,397,214
PROCESS OF REACTING TETRAALKYLALLENE
WITH PALLADOUS HALIDE
Robert G. Schultz, St. Louis, Mo., assignor to Monsanto
Company, St. Louis, Mo., a corporation of Delaware
No Drawing. Filed Nov. 12, 1964, Ser. No. 410,711
5 Claims. (Cl. 260—429)

ABSTRACT OF THE DISCLOSURE

Reaction of tetraalkylallene with dihalo-bis-arylcyanide palladium (II) to obtain tetraalkylallyl complexes of palladium.

---

The present invention is directed to a process of preparing tetraalkylallyl complexes of palladium by reacting tetraalkylallene with palladous halide. The process of the present invention involves the reaction of tetraalkylallene with palladium (II) halide to obtain tetraalkylallyl palladium complexes, such as di-$\mu$-halo-di-$\pi$-($\beta$-halo-$\alpha,\alpha,\alpha',\alpha'$-tetraalkylallyl, dipalladium (II) and related complexes in which one or more $\beta$-halo groups are replaced by hydroxyl or alkoxyl or 3-halo-1-propen-2-yl groups. The halo groups in any of the foregoing reactants or products can be iodo, chloro or bromo groups. The process of the present invention is illustrated:

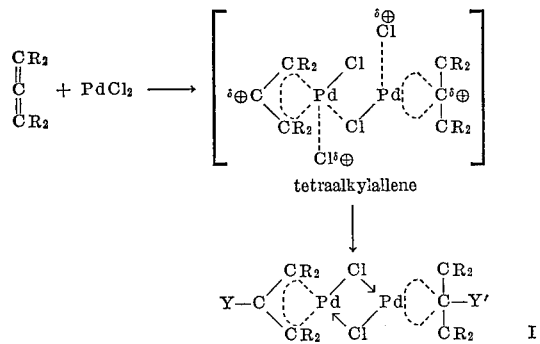

in which each R is an alkyl group, preferably of no more than 10 carbon atoms, and can be the same as or different from other R's, and Y and Y' are individually selected from the group consisting of —Cl and

Other halogens can be substituted for the chloride in both the PdCl$_2$ reactant and the product. The final products, as pictured in the formula are $\pi$-allyl-complexes, i.e., di-$\mu$-chloro-di-$\pi$-($\beta$-chloro-$\alpha,\alpha,\alpha',\alpha'$-tetraalkylallyl) dipalladium (II), di-$\mu$-chloro-$\pi$-($\beta$-chloro-$\alpha,\alpha,\alpha',\alpha'$-tetraalkylallyl)-$\pi$-($\beta$-(1,1,3,3-tetraalkyl-3-chloro-1-propen-2-yl)-$\alpha,\alpha,\alpha',\alpha'$-tetraalkylallyl) dipalladium (II), and di-$\mu$-chloro-di-$\pi$-($\beta$-1,1,3,3-tetraalkyl-3-chloro-1-propen-2-yl)-$\alpha,\alpha,\alpha',\alpha'$-tetraalkylallyldipalladium (II). The illustrated structures with $\pi$-allyl bonding are present in benzonitrile solution, and the $\pi$-ally bonding is also present in the solid form of the complexes. However, the bonds are converted to sigma ($\sigma$) bonds by dissolution in dimethylsulfoxide. When the reaction is conducted in aqueous or alcohol solutions, some or all of the chloro groups can be replaced by hydroxyl or alkoxyl groups respectively.

In order to provide a suitable reaction system, preferably with the reactants in a homogeneous system, the palladium (II) halide is solubilized in the chosen reaction medium. For example, palladous halide is complexed with benzonitrile to form bis-benzonitrile palladium (II) for reaction in benzonitrile or benzene, and alkali metal halopalladite, e.g., sodium chloropalladite or potassium bromopalladite, K$_2$++PdBr$_4$=, are soluble in methanol. Other ways of solubilizing the palladous halide for reaction in various media will be apparent to those skilled in the art.

The invention is further illustrated by the following example.

Example.—Di-$\mu$-chloro-di-$\pi$-($\beta$-chloro-$\alpha,\alpha,\alpha',\alpha'$-tetramethylallyl)-dipalladium (II)

To a solution of 769 mg. (2.02 mmoles) of dichlorobisbenzonitrile palladium (II) in 110 ml. benzene at 25° was added 7.2 g. tetramethylallene. Over a period of five minutes the solution changed in color from red-brown to pale yellow. The solution was evaporated to small volume and heptane added. The resulting solid was filtered, washed with heptane and air dried yielding 423 mg. (77.2%) of di-$\mu$-chloro-di-$\pi$-($\beta$-chloro-$\alpha,\alpha,\alpha',\alpha'$-tetramethylallyl)dipalladium (II), dec. pt. 137–140°. Recrystallization from chloroform-heptane afforded the pure compound, dec. pt. 140–141°.

Analysis.—Found: C, 30.8; H, 4.9; Cl, 26.4. Calc'd for C$_{14}$H$_{24}$Cl$_4$Pd$_2$: C, 30.7; H, 4.4; Cl, 25.9.

The nuclear magnetic resonance spectrum is deuterated chloroform shows two methyl peaks of equal intensity at 1.62 and 1.64 cps. relative to a tetramethyl silane internal standard.

The dichloro bis-benzonitrile palladium (II) utilized in the example was prepared by suspending palladium dichloride (PdCl·2H$_2$O) in benzonitrile, heating to 100° C., and cooling and filtering to obtain yellow crystals of dichloro bis-benzonitrile palladium (II).

The present process is similar to that involving reactions of allene, rather than tetraalkylallene, with palladous halide, as described in my copending application S.N. 327,126, filed Nov. 29, 1963, and the procedures described in the copending application can be applied in the present process. As was the case in the reaction with allene illustrated in the copending application, adding the tetraalkylallene to the dichloro bis-aryl cyanide palladium (in temporary excess) in benzene (or other aromatic or saturated aliphatic hydrocarbon solvent) results in a product in which both Y and Y' in Formula I above are chloro, while addition of the same palladium (II) complex to excess tetraalkylallene in benzene (or other suitable hydrocarbon) results in the product represented by I in which Y is chloro while Y' is

and reaction of the same complex in benzonitrile (or other aryl cyanide) produces predominantly the compound represented by I when both Y and Y' are

The tendency toward production of this third type compound is generally found with polar solvents, although some also cause substitution of other groups for chloro groups. For example, when reaction is conducted in lower alcohols, e.g., those of 1 to 6 carbon atoms, methanol, ethanol, propanol, isopropanol, butanol, amyl alcohols, and hexanol, some or all of the chloro groups can be replaced by alkoxyl groups.

The processes of the present invention are generally conducted at room temperature, although higher or lower temperatures can be employed if desired.

The benzonitrile serves as a complexing agent to solubilize the PdCl$_2$ in the illustrative example, and other aryl cyanides can be substituted for their purpose. Aryl cyanides in which the aryl group is hydrocarbon, e.g., containing ethyl, methyl or other lower alkyl substituents, or halo substituents, are generally suitable. The complex can be prepared as illustrated in M. S. Kharasch, R. C. Seyler and F. R. Mayo, J. Am. Chem. Soc., 60, 882 (1938).

The compounds produced according to the present invention can be used as oil additives, gasoline additives, anti-oxidants, catalysts, etc., as well as organic intermediates for production of other organic compounds. The compounds undergo metathesis of bridging halides by other halides, e.g., of chlorine by bromine or iodine, and also by thiocyanate.

What is claimed is:

1. The method of preparing tetraalkylallylic complexes of palladium which comprises reacting palladous halide in solution in complexed form with tetraalkylallene, the halide atoms having an atomic weight greater than 19.

2. The method of preparing di-$\mu$-halo-di-$\pi$-($\beta$-halo-$\alpha,\alpha,\alpha',\alpha'$-tetraalkyl) dipalladium (II) which comprises adding tetraalkylallene to a hydrocarbon solution of palladous halide in complexed form, in which the halides are selected from the group consisting of bromide, chloride and iodide.

3. The method of claim 2 in which the palladous halide is dihalo-bis-aryl cyanide palladium (II).

4. The method of preparing tetramethylallylic complexes of palladium which comprises reacting dichloro-bis-benzonitrile palladium (II) in solution with tetramethylallene.

5. The method of preparing tetraalkylallylic complexes of palladium which comprises reacting dihalo-bis-aryl-cyanide palladium (II) in solution with tetraalkylallene.

References Cited

Lupin et al.: Tetrahedron Letters, No. 15, pp. 883–5.

TOBIAS E. LEVOW, *Primary Examiner.*

A. P. DEMERS, *Assistant Examiner.*